June 4, 1968  H. LORENZ  3,386,726

CLAMPING DEVICE

Filed April 5, 1965

INVENTOR
Horst Lorenz
by Michael S. Striker
Attorney

United States Patent Office 3,386,726
Patented June 4, 1968

3,386,726
CLAMPING DEVICE
Horst Lorenz, Solingen, Germany, assignor to
Th. Kieserling & Albrecht, Solingen, Germany
Filed Apr. 5, 1965, Ser. No. 445,440
Claims priority, application Germany, Apr. 4, 1964,
K 52,573
10 Claims. (Cl. 269—31)

The present invention relates to a clamping device, and more particularly to a clamping device for clamping a workpiece such as a rod or pipe in the clamping carriage of a machine tool having a rotary cutter head for removing a surface layer of the clamped workpiece.

In machine tools of this type, the cutter head exerts a turning moment on the workpiece, and the clamping device must hold the workpiece rigidly enough to prevent any turning of the same under the action of the turning moment exerted by the cutter head.

The clamping carriages according to the prior art are provided with a pair of clamping jaws which are operated by levers controlled by a toggle lever system, and actuated by a hydraulic motor. In accordance with the prior art, the piston rod of the hydraulic motor is connected with a toggle lever acting on the free end of the levers which actuate the clamping jaws. Since the required clamping pressure varies as the diameter of the workpiece is reduced the positions of the fulcrums of levers controlling the clamping jaws has to be adjusted. This required a very precise adjustment by the operator, since otherwise the angle of the toggle levers is either too large or too small, so that the clamping force exerted by the clamping jaws may also be either too large or too small.

It is one object of the present invention to overcome the disadvantages of known clamping arrangements and to provide a clamping device which does not require adjustment when the diameter of the workpiece is reduced.

Another object of the invention is to provide a clamping device in which a pair of clamping members is actuated to move to a clamping position symmetrically to a plane of symmetry and at the same speed.

Another object of the invention is to control a pair of clamping members by levers which are interconnected for synchronous angular movement.

Another object of the invention is to operate interconnected levers actuating clamping members by fluid-operated means directly connected to the levers.

Another object of the invention is to vary the clamping pressure by variation of the fluid pressure of the fluid-operated means.

With these objects in view, the present invention relates to a clamping device, which is particularly suitable for clamping a workpiece from which a peripheral layer is removed by a rotary cutter head. One embodiment of the invention comprises a pair of clamping members mounted on a support for movement towards and away from a plane of symmetry in which a workpiece is located when the clamping members are in a clamping position; a pair of turnable members, such as double-armed levers mounted on the support for turning movement about two parallel axes and being connected with the clamping members, respectively; fluid-operated means, such as a piston and cylinder, forming a chamber for a pressure fluid and including two movable pressure members which are respectively connected with the levers for turning the same so that the clamping members are moved to the clamping position; and means connecting the levers for turning movement at the same angular speed, for example, meshing gears. Since the levers are forced to turn at the same speed, the clamping members move at the same speed toward each other and remain in the clamping position symmetrical to the plane of symmetry.

In another embodiment of the invention, each lever has a projecting arm, and a forked end on one arm embraces a pin on the other arm for connecting the levers for angular movement at the same speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
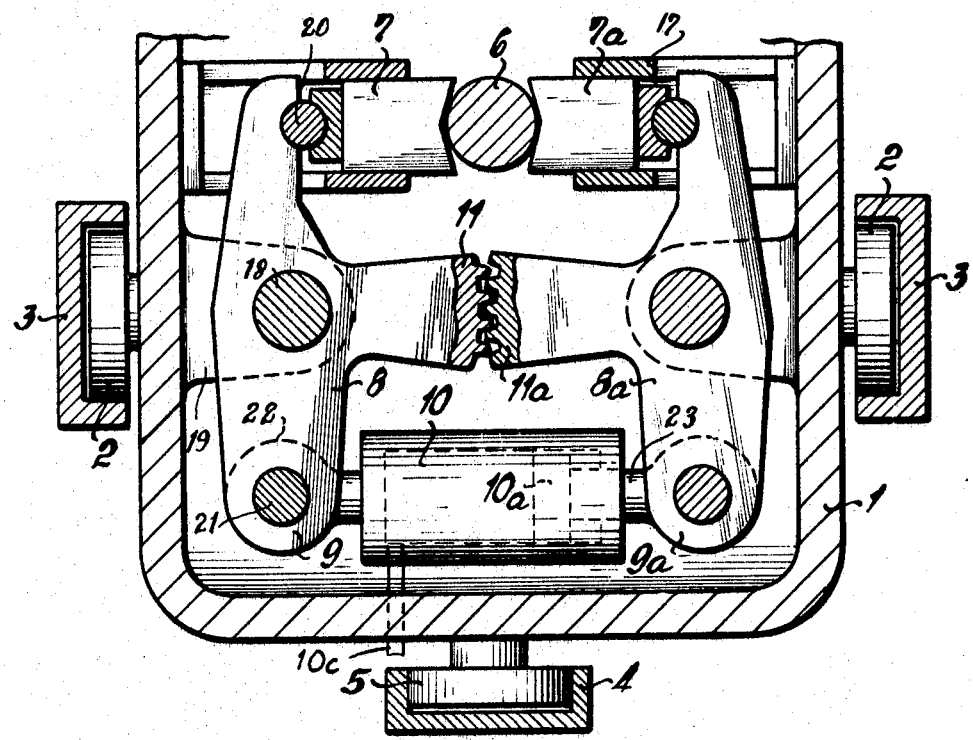
FIG. 1 is a sectional view illustrating one embodiment of the invention.

Referring now to the drawings, and more particularly to FIG. 1, a clamping carriage 1 carries a pair of rollers 2 which are turnable about a horizontal axis, and a roller 5 turnable about a vertical axis. A pair of guide rails 3 guide rollers 2 and thereby the clamping carriage 1 for longitudinal movement, and turning motions of the clamping carriage 1 are prevented by a guide rail 4 engaged by roller 5. A pair of clamping members 7, 7a is mounted in guide means 17 which are fixed to the clamping carriage 1.

A pair of turnable lever members 8, 8a are mounted on shafts 18 which are supported on brackets 19 so that levers 8, 8a can turn about a pair of parallel axes. The upper ends of levers 8, 8a act on clamping members 7, 7a through pivotal joints including pins 20 turnable in corresponding bearing recesses in levers 8, 8a and clamping members 7, 7a. Clamping members 7, 7a have confronting recessed faces for symmetrically engaging a cylindrical workpiece 6.

The ends 9, 9a of levers 8, 8a carry pivot pins 21 which are mounted in bearing members 22 at the ends of a pair of piston rods 23 which are respectively connected with a cylinder 10 and a piston 10a of a fluid-operated motor to which pressure fluid is supplied through a conduit 10c which opens into a chamber formed by cylinder 10. Cylinder 10 and piston 10a have faces of equal area bounding the pressure chamber in cylinder 10 so that the same pressure acts on piston rods 23 in opposite directions whereby a turning moment is exerted on each of levers 8, 8a.

The levers are urged to turn in opposite directions so that clamping members 7, 7a are moved toward each other to a clamping position engaging opposite sides of workpiece 6. Clamping members 7, 7a are connected with levers 8, 8a, respectively so as to move apart when the levers are turned in opposite directions.

Figure 2:
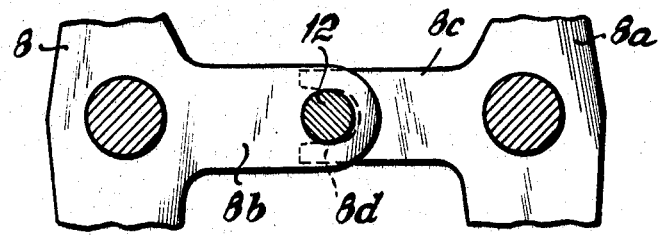
FIG. 2 is a fragmentary sectional view corresponding to FIG. 1 but illustrating a modified detail, of the clamping device shown in FIG. 1.

Means are provided for connecting levers 7, 7a for synchronous turning movement at the same angular speed and for the same angle. In the embodiment of FIG. 1, each lever has a projecting arm whose free end is provided with a gear segment 11 and 11a, respectively, the gear segments meshing with each other. In the modified embodiment of FIG. 2, the arm 8c of lever 8a has a forked free end 8d embracing a transverse pin 12 carried by the arm 8d of lever 8.

The mechanical linkages 8d, 12 and 11, 11a assures a symmetrical and synchronous turning movement of the levers.

Other mechanical linkages may be provided, for example, pinions may be secured to levers 8, 8a for turning movement and connected by a suitable gear train.

When pressure fluid is supplied through conduit 10c into the chamber of cylinder 10, cylinder 10 and piston 10a move apart at the same speed and apply the same pressure against pins 21 since the effective faces of cylinder 10 and piston 10a have the same areas. Therefore, the same pressure is applied by the levers on the clamping members 7, 7a and transmitted by the same to workpiece 6. Due to the mechanical linkage 11, 11a, or 12, 8d and the symmetrical operation of the fluid-operated means 10, 10a, the movement of the clamping members 7, 7a takes place at the same speed, and symmetrical to a plane of symmetry passing through the center of the workpiece 6, and an increase of the pressure in cylinder 10 while clamping members 7, 7a are already in the clamping position, will increase the pressure of the clamping members 7, 7a on the workpiece but will not displace, the same of its initial position so that the center of the workpiece remains in the plane of symmetry, and in the axis of rotation of a cutter head, not shown, which rotates about the workpiece and removes a layer from the cylindrical surface of the same.

It will be understood that each of the elements described above, or two or more together, may also find a useful application in other types of clamping devices differing from the types described above.

While the invention has been illustrated and described as embodied in a clamping device including mechanically interconnected fluid-operated levers for actuating a pair of clamping members in a symmetrical movement, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitutes essential characteristics of the generic and specific aspects of this invention and, therefore, such adaptations should and are intended to be comprehended within the meaning and range of equivalence of the following claims.

What is claimed as new and desired to be secured by Letters Patent is:

1. A clamping device comprising, in combination, a support; a pair of clamping members mounted on said support for movement toward and away from a plane of symmetry and between an inoperative position and a clamping position adapted to engage and clamp a workpiece whose center is located in said plane of symmetry; a pair of turnable members mounted on said support for turning movement about two parallel axes and having portions connected with said clamping members, respectively and arc-shaped meshing portions arranged in said plane of symmetry and having their centers located in said parallel axes respectively; fluid-operated means forming a chamber for a pressure fluid and including two movable pressure members having faces bounding said chamber, said pressure members being, respectively, connected with said turnable members for turning the same about said axes for moving said clamping members to said clamping position while said meshing portions connect said turntable members for turning movement at the same angular speed so that said clamping members move at the same speed toward each other and remain in said clamping position symmetrical to said plane of symmetry for yieldingly holding a workpiece.

2. A clamping device for holding a work piece whose periphery is cut by a rotary cutting tool, comprising, in combination, a support; a pair of clamping members mounted on said support for movement toward and away from a plane of symmetry and between an inoperative position and a clamping position adapted to engage and clamp a workpiece whose center is located in said plane of symmetry; a pair of levers mounted on said support for turning movement about two parallel axes and having ends pivotally connected with said clamping members, respectively, each of said levers having a projecting arm, said arm having arc-shaped meshing portions arranged in said plane of symmetry and having their centers located in said parallel axes respectively; fluid-operated means forming a chamber for a pressure fluid and including two movable pressure members having faces bounding said chamber, said pressure members being, respectively, pivotally connected with said levers for turning the same about said axes for moving said clamping members to said clamping position while said meshing end portions and said arms connect said levers for turning movement at the same angular speed so that said clamping members move at the same speed toward each other and remain in said clamping position symmetrical to said plane of symmetry for yieldingly holding a workpiece.

3. A clamping device for holding a work piece whose periphery is cut by a rotary cutting tool, comprising, in combination, a support; a pair of clamping members mounted on said support for movement toward and away from a plane of symmetry and between an inoperative position and a clamping position adapted to engage and clamp a workpiece whose center is located in said plane of symmetry; a pair of levers mounted on said support for turning movement about two parallel axes and having end portions pivotally connected with said clamping members, respectively, each of said levers having a projecting arm having a free end located in said plane of symmetry, one of said free ends having a pin, and the other free end being fork-shaped and embracing said pin; and fluid-operated means forming a chamber for a pressure fluid and including two movable pressure members having faces bounding said chamber, said pressure members being, respectively, pivotally connected with said levers for turning the same about said axes for moving said clamping members to said clamping position, said pin and said fork-shaped end connecting said arms and said levers for turning movement at the same angular speed so that said clamping members move at the same speed toward each other and remain in said clamping position symmetrical to said plane of symmetry for yieldingly holding a workpiece.

4. A clamping device for holding a work piece whose periphery is cut by a rotary cutting tool, comprising, in combination, a support; a pair of clamping members mounted on said support for movement toward and away from a plane of symmetry and between an inoperative position and a clamping position adapted to engage and clamp said workpiece whose center is located in said plane of symmetry; a pair of double-armed levers mounted on said support for turning movement about two parallel axes and having first end portions pivotally connected with said clamping members, respectively, each of said double-armed levers having a third projecting arm having a free end located in said plane of symmetry, one of said free ends having a pin and the other free end being fork-shaped and embracing said pin; and fluid-operated means for forming a chamber for a pressure fluid and including two movable pressure members having faces bounding said chamber, said pressure members being, respectively, pivotally connected with the other ends of said double-armed levers for turning the same about said axes for moving said clamping members to said clamping position; said pin and said fork-shaped end connecting said arms and said double-armed levers for turning movement at the same angular speed so that said clamping members move at the same speed toward each other and remain in said clamping position symmetrical to said plane of symmetry for yieldingly holding a workpiece.

5. A clamping device for holding a work piece whose periphery is cut by a rotary cutting tool, comprising, in combination, a support; a pair of clamping members mounted on said support for movement toward and away from a plane of symmetry and between an inoperative position and a clamping position adapted to engage and clamp a workpiece whose center is located in said plane of symmetry; a pair of turnable members mounted on said support for turning movement about two parallel axes and having portions connected with said clamping members, respectively, each of said turnable members having a gear portion located in said plane of symmetry meshing with the corresponding gear portion of the respective other turnable member so that said turnable members are connected for turning movement at the same angular speed; and fluid-operated means forming a chamber for a pressure fluid and including two movable pressure members having faces bounding said chamber, said pressure members being respectively connected with said turnable members for turning the same about said axes for moving said clamping members to said clamping position whereby said meshing gear portions cause movement of said clamping members at the same speed symmetrical to said plane of symmetry for yieldingly holding a workpiece.

6. A clamping device for holding a work piece whose periphery is cut by a rotary cutting tool, comprising, in combination, a support; a pair of clamping members mounted on said support for movement toward and away from a plane of symmetry and between an inoperative position and a clamping position adapted to engage and clamp a workpiece whose center is located in said plane of symmetry; a pair of turnable lever members mounted on said support for turning movement about two parallel axes and having portions connected with said clamping members, respectively, each of said turnable lever members having a gear portion located in said plane of symmetry meshing with the corresponding gear portion of the respective other turnable lever member so that said turnable lever members are connected for turning movement at the same angular speed; and fluid-operated means forming a chamber for a pressure fluid and including two movable pressure members having faces bounding said chamber, said pressure members being respectively connected with said turnable lever members for turning the same about said axes for moving said clamping members to said clamping position whereby said meshing gear portions cause movement of said clamping members at the same speed symmetrical to said plane of symmetry for yieldingly holding a workpiece.

7. A clamping device for holding a workpiece whose periphery is cut by a rotary cutting tool, comprising, in combination, a support; a pair of clamping members mounted on said support for movement toward and away from a plane of symmetry and between an inoperative position and a clamping position adapted to engage and clamp a workpiece whose center is located in said plane of symmetry; a pair of double-armed levers mounted on said support for turning movement about two parallel axes and having first end portions pivotally connected with said clamping members, respectively, each of said levers having a third projecting arm having a free end formed as a gear segment located in said plane of symmetry, said gear segments of said levers meshing with each other for connecting said levers for turning movement at the same angular speed; and fluid-operated means forming a chamber for a pressure fluid and including two movable pressure members having faces bounding said chamber, said pressure members being, respectively, connected with the other ends of said double-armed levers for turning the same about said axes for moving said clamping members to said clamping position whereby said meshing gear portions cause movement of said clamping members at the same speed symmetrical to said plane of symmetry for yieldingly holding a workpiece.

8. A clamping device as set forth in claim 4 wherein said two movable pressure members are a cylinder and a piston in said cylinder, and wherein said fluid-operated means includes a pair of rods respectively secured to said cylinder and to said piston, and having free ends with bearings, and including a pair of pivot pins respectively secured to said levers and located in said bearings.

9. A clamping device as set forth in claim 6, wherein said two movable pressure members are a cylinder and a piston in said cylinder, and wherein said fluid-operated means includes a pair of rods respectively secured to said cylinder and to said piston, and having free ends with bearings, and including a pair of pivot pins respectively secured to said levers and located in said bearings.

10. A clamping device as set forth in claim 1 wherein said support is a clamping carriage including guide means for said clamping members and having rollers; and guide rail means supporting said rollers for guiding said clamping carriage and for preventing turning movement of the same about the axis of said workpiece.

References Cited

UNITED STATES PATENTS

| 116,649 | 7/1871 | Wagner | 279—106 |
| 2,972,964 | 2/1961 | Alleman | 294—88 X |
| 3,170,322 | 2/1965 | Cavanough | 269—34 X |

FOREIGN PATENTS

| 821,825 | 11/1951 | Germany. |
| 22,544 | 1896 | Great Britain. |

ROBERT C. RIORDON, *Primary Examiner.*

J. F. McKEOWN, D. G. KELLY, *Assistant Examiners.*